United States Patent
Lancioni et al.

(10) Patent No.: US 11,831,419 B2
(45) Date of Patent: Nov. 28, 2023

(54) METHODS AND APPARATUS TO DETECT WEBSITE PHISHING ATTACKS

(71) Applicant: McAfee, LLC, Santa Clara, CA (US)

(72) Inventors: German Lancioni, Cordoba (AR);
Bhargav Shah, Santa Clara, CA (US);
James Duldulao, Santa Clara, CA (US)

(73) Assignee: MCAFEE, LLC, San Jose, CA (US)

( * ) Notice: Subject to any disclaimer, the term of this patent is extended or adjusted under 35 U.S.C. 154(b) by 565 days.

(21) Appl. No.: 16/586,461

(22) Filed: Sep. 27, 2019

(65) Prior Publication Data
US 2021/0099485 A1 Apr. 1, 2021

(51) Int. Cl.
*H04L 9/40* (2022.01)

(52) U.S. Cl.
CPC ...... *H04L 63/1483* (2013.01); *H04L 63/1416* (2013.01); *H04L 63/1425* (2013.01); *H04L 63/1433* (2013.01); *H04L 63/1466* (2013.01); *H04L 63/168* (2013.01)

(58) Field of Classification Search
None
See application file for complete search history.

(56) References Cited

U.S. PATENT DOCUMENTS

| | | | | |
|---|---|---|---|---|
| 8,374,983 B1 * | 2/2013 | Pohl | ...... | G06F 16/954 706/46 |
| 8,521,667 B2 * | 8/2013 | Zhu | ...... | H04L 63/1408 706/13 |
| 8,850,570 B1 * | 9/2014 | Ramzan | ...... | H04L 63/145 713/188 |
| 8,943,588 B1 * | 1/2015 | Speegle | ...... | H04L 63/1416 726/22 |
| 9,178,901 B2 * | 11/2015 | Xue | ...... | H04L 63/1483 |
| 10,104,113 B1 * | 10/2018 | Stein | ...... | H04L 63/1425 |
| 10,200,381 B2 * | 2/2019 | Hunt | ...... | G06F 21/645 |
| 10,554,507 B1 * | 2/2020 | Siddiqui | ...... | H04L 63/1433 |

(Continued)

FOREIGN PATENT DOCUMENTS

| CN | 109150873 A | * | 1/2019 |
|---|---|---|---|
| WO | 2016201938 | | 12/2016 |

OTHER PUBLICATIONS

International Searching Authority, "Search Report," issued in connection with International Patent Application No. PCT/US2020/052528, dated Dec. 7, 2020, 7 pages.

Ding et al., "A keyword-based combination approach for detecting phishing webpages," Elsevier, Computers & Security, [www.elsevier.com/locate/cose], Mar. 23, 2019, 20 pages.

Bergholz et al.,"New Filtering Approaches for Phishing Email," [http://www.antiphishresearch.org/downloads/journal-08-12-16-final.pdf], retrieved Mar. 20, 2012, 31 pages.

(Continued)

*Primary Examiner* — Arezoo Sherkat
(74) *Attorney, Agent, or Firm* — Hanley, Flight & Zimmerman, LLC

(57) ABSTRACT

Methods, apparatus, systems and articles of manufacture to detect phishing websites are disclosed. An example apparatus includes a plurality of website analyzers to analyze a requested website for evidence of a phishing attack, the plurality of website analyzers including a first website analyzer and a second website analyzer. An analysis selector is to select the first website analyzer for execution, the analysis selector to, in response to determining that an additional analyzer is to be executed, select the second website analyzer to analyze the requested website. A website classifier is to, in response to a website analyzer indicating a classification that exceeds a confidence threshold, classify the requested website as a benign site or presenting a phishing attack.

21 Claims, 11 Drawing Sheets

(56) References Cited

U.S. PATENT DOCUMENTS

| | | | |
|---|---|---|---|
| 10,601,865 B1* | 3/2020 | Mesdaq | H04L 63/1425 |
| 10,785,255 B1* | 9/2020 | Otvagin | H04L 63/145 |
| 10,904,286 B1* | 1/2021 | Liu | H04L 63/0245 |
| 11,240,275 B1* | 2/2022 | Vashisht | H04L 63/145 |
| 2010/0251380 A1 | 9/2010 | Zhang et al. | |
| 2014/0173726 A1* | 6/2014 | Varenhorst | H04L 63/101 726/22 |
| 2015/0007312 A1* | 1/2015 | Pidathala | H04L 63/145 726/22 |
| 2016/0201938 A1 | 7/2016 | Choi | |
| 2018/0097822 A1* | 4/2018 | Huang | G06N 20/00 |
| 2018/0115573 A1 | 4/2018 | Kuo et al. | |
| 2018/0260460 A1* | 9/2018 | Alba | G06F 16/24522 |
| 2020/0053120 A1* | 2/2020 | Wilcox | G06Q 10/107 |
| 2020/0252428 A1* | 8/2020 | Gardezi | H04L 63/168 |
| 2020/0382551 A1* | 12/2020 | Harris | G06F 21/554 |
| 2021/0097168 A1* | 4/2021 | Patel | G06F 21/554 |

OTHER PUBLICATIONS

Blum et al., "Lexical feature based phishing URL detection using online learning," [https://www.researchgate.net/publication/221609867]. Jan. 2010, 8 pages.

Ndibwile et al., "UnPhishMe: Phishing Attack Detection by Deceptive Login Simulation through an Android Mobile App," [https://www.researchgate.net/publication/319261465], Aug. 2017, 11 pages.

Shahriar, "PhishTester: Automatic Testing of Phishing Attacks," [https://www.researchgate.net/publication/221502750], Jan. 2010, 11 pages.

International Searching Authority, "Written Opinion," issued in connection with International Patent Application No. PCT/US2020/052528, dated Dec. 7, 2020, 10 pages.

International Searching Authority, "International Preliminary Report on Patentability," dated Mar. 15, 2022 in connection with International Patent Application No. PCT/US2020/052528, 8 pages.

* cited by examiner

METHODS AND APPARATUS TO DETECT WEBSITE PHISHING ATTACKS

FIELD OF THE DISCLOSURE

This disclosure relates generally to website phishing and, more particularly, methods and apparatus to detect website phishing attacks.

BACKGROUND

Phishing attacks are malicious user interfaces and/or messages (emails, websites, applications) that are disseminated by attackers to attempt to steal a user's private information. Phishing attacks impersonate trusted entities (e.g., a banking website) to convince users to submit private data, install malware, and/or gain access to sensitive networks. Phishing attacks cause serious harm and privacy breaches to many Internet users.

Figure 1:
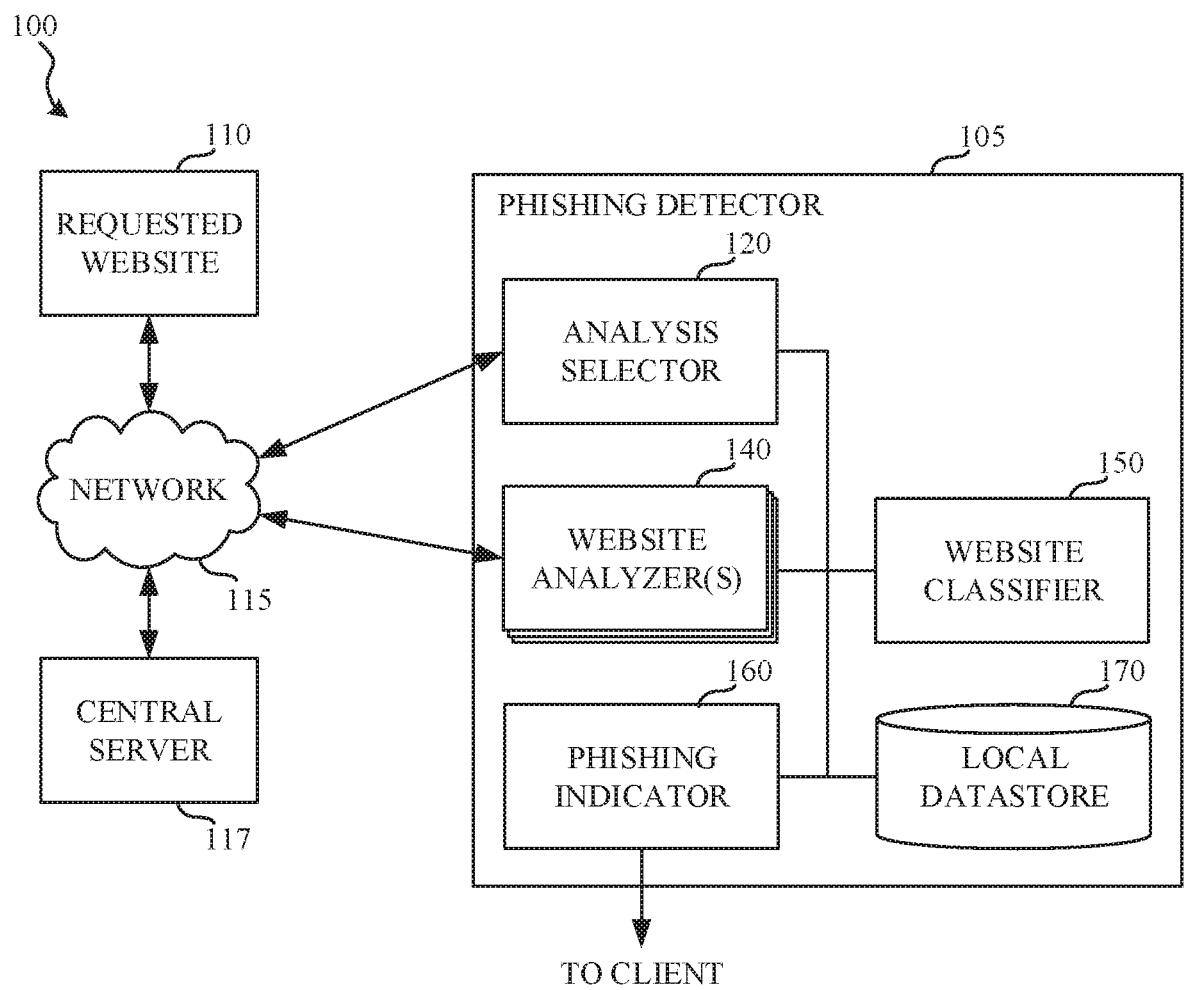
FIG. 1 depicts an example environment of use including an example phishing detector to indicate to a client whether a requested website is a phishing attack.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Examples disclosed herein can be used to detect whether a requested website presents a phishing attack or is a benign website. Further, examples disclosed herein enable phishing to be detected using a combination of website analysis methods. In some examples, classifications generated by a phishing detector may be used to prevent a client device from visiting a phishing website. In other examples, classifications may also be used to generate a whitelist of common benign websites to be used by client devices.

FIG. 1 depicts an example environment of use 100 including an example phishing detector 105 to indicate to a client whether a requested website presents a phishing attack. The example environment of use 100 includes a phishing detector 105, a requested website 110, a network 115, and a central server 117. In some examples, the example phi sling detector 105 may be implemented on a router. In other examples, the example phishing detector 105 may be implemented on a user device, such as a web browser extension or an anti-virus package.

The example central server 117 of the illustrated example of FIG. 1 is a server that communicates via a network such as, for example, the external network 115 (e.g., the Internet), to provide instructions that may be executed at the phishing detector 105. That is, the example central server 117 provides instructions (e.g., executable instructions) to the phishing detector 105 to enable the detection the presence of phishing attacks. In some examples, the instructions provided to the phishing detector 105 are executable instructions that may be directly executed at the phishing detector 105. However, in some examples, the instructions are provided as part of a software development kit (SDK), application programming interface (API) to an intermediary party (e.g., a manufacturer, an app developer) to enable the intermediary party to create (e.g., design, develop, compile, etc.) executable instructions (e.g., an application, firmware, etc.) to be executed at the phishing detector 105. In some examples, the central server 117 provides additional information such as, for example, a model to a website analyzer 140 to facilitate the detection the presence of a phishing attack.

The example phishing detector 105 of FIG. 1 includes an analysis selector 120, website analyzers 140, website classifiers 150, a phishing indicator 160, and a local datastore 170. An example website analyzer chain 200 depicting an organization of example website analyzers 140 and an example website classifier 150 is further explained in connection with FIG. 2A.

The example analysis selector 120 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc. The example analysis selector 120 selects a first example website analyzer 140 to classify a requested website 110 as benign or suspicious. In examples disclosed herein, the example analysis selector 120 selects a first example website analyzer 140 using a predefined order. However, any other method for selecting a first example website analyzer 140 may be additionally and/or alternatively used. For example, the example analysis selector 120 may select a first example website analyzer 140 using the most distant time at which the example website analyzers 140 were last run. In some examples, the example analysis selector 120 implements means for selecting.

Further, in examples disclosed herein, the set of example website analyzers 140 may be implemented using any one or more of an example target site analyzer (e.g., the target site analyzer 300 described below in connection with FIG. 3), an example site content analyzer (e.g., the example site content analyzer 400 described below in connection with FIG. 4), and/or an example site behavior analyzer the example site behavior analyzer 500 described below in connection with FIG. 5). However, any other method for analyzing a website may additionally and/or alternatively used. For example, the set of example website analyzers 140 may include a whitelist of websites that are known to be benign, a blacklist of websites that are known to be malicious, etc. In some examples, the example website analyzer 140 implements means for analyzing.

The example website analyzer 140 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example website analyzer 140 executes an analysis on a requested website 110 to determine whether the requested website 110 is benign or suspicious. In some examples, a website analyzer 140 may retrieve the contents of the website via a network such as the Internet. In other examples, the website analyzer may classify a website using the contents of the website.

The example website classifier 150 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example website classifier 150 classifies a requested website 110 as either benign or as presenting a phishing attack using the results of the website analyzers 140. If an example website analyzer 140 calculates a result marked as suspicious and the calculation exceeds a confidence threshold, the example website classifier 150 classifies the requested website 110 as presenting a phishing attack. In some examples, the example website classifier 150 implements means for classifying.

In examples disclosed herein, the example website classifier 150 determines that a result is marked as suspicious using the confidence threshold. If the value output by the example website analyzer is above a threshold, the result is considered suspicious. However, any other method of determining whether a result is marked suspicious may be additionally and/or alternatively used.

The example phishing indicator 160 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example phishing indicator 160 indicates to a user and/or client that the requested website was identified to be presenting a phishing attack if the example website classifier 150 determines that the requested website 110 is presenting a phishing attack. In examples disclosed herein, the example phishing indicator 160 indicates the presence of a phishing attack via a web page redirect. However, any other methods to indicate the presence of a phishing attack may additionally and/or alternatively be used.

The example local datastore 170 of the illustrated example of FIG. 1 is implemented by any memory, storage device and/or storage disc for storing data such as, for example, flash memory, magnetic media, optical media, solid state memory, hard drive(s), thumb drive(s), etc. Furthermore, the data stored in the example local datastore 170 may be in any data format such as, for example, binary data, comma delimited data, tab delimited data, structured query language (SQL) structures, etc. While, in the illustrated example, the example local datastore 170 is illustrated as a single device, the example local datastore 170 and/or any other data storage devices described herein may be implemented by any number and/or type(s) of memories. In the illustrated example of FIG. 1, the local datastore 170 stores the contents of websites retrieved by example website analyzers 140 and the classification outputs of the example website analyzers 140.

Figure 2A:
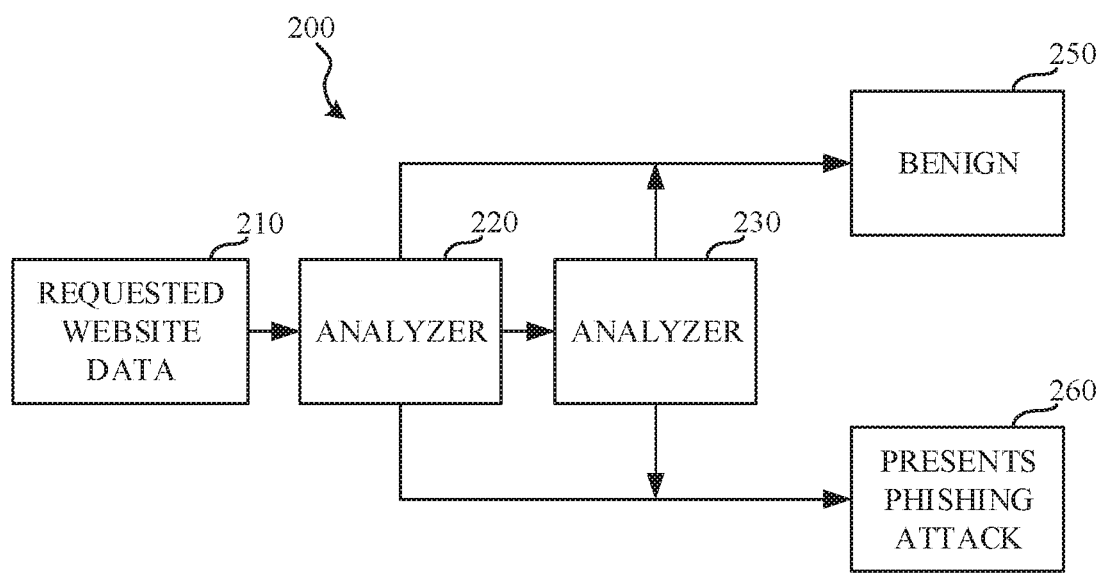
FIG. 2A is a block diagram describing a first example website analyzer chain to label requested website data as either a benign site or as presenting a phishing attack.

FIG. 2A is a block diagram describing a first example website analyzer chain 200 to label requested website data as either a benign site or as presenting a phishing attack. The example website analyzer chain 200 depicts an example organization of example website analyzers 140 and an example website classifier 150 as described in FIG. 1. The example website analyzer chain 200 includes example requested website data 210, a first website analyzer 220, a second website analyzer 230, an example benign label 250, and an example phishing attack label 260.

The example website analyzer chain accesses example requested website data 210. In some examples, the requested website data 210 includes a uniform resource locator (URL) to a requested website 110. In other examples, the requested website data 210 includes contents and/or metadata of a requested website 110.

The first example website analyzer 220 uses the requested website data 210 to execute an analysis on a requested website 110 to determine whether the requested website 110 is benign or suspicious. If a confidence value of a classification by the first example website analyzer 220 exceeds the confidence threshold, and the classification indicates that the requested website 110 is legitimate, the website analyzer chain 200 classifies the requested website 110 as benign 250. If the confidence value exceeds the confidence threshold and the classification indicates that the requested website 110 is suspicious, the website analyzer chain 200 classifies the requested website 110 as presenting a phishing attack 260.

In examples disclosed herein, a single confidence threshold is used across each of the website analyzers. However, in some examples, multiple different confidence thresholds may additionally or alternatively be used. For example, a first confidence threshold may be used in connection with the first website analyzer 220, while a second confidence threshold (different from the first confidence threshold) may be used in connection with the second website analyzer 230. Using multiple different confidence thresholds enables the various website analyzers to detect malicious websites with varying levels of sensitivities for different potentially malicious factors. Further, in some examples, criteria other than confidence thresholds may additionally or alternatively be used. For example, an execution time threshold may be used in connection with the first website analyzer 220, while a confidence threshold may be used in connection with the second website analyzer 230.

Otherwise, if the confidence value of the classification by the first example website analyzer 220 does not exceed the confidence threshold, the second example website analyzer 230 executes an analysis to determine whether the requested website 110 is benign or suspicious. If the second example website analyzer 230 determines that the requested website 110 presents a phishing attack, the website analyzer chain 200 classifies the requested website 110 as presenting a phishing attack 260. Otherwise, the website analyzer chain 200 classifies the requested website 110 as benign 250.

In examples disclosed herein, the website analyzer chain 200 includes two website analyzers 220, 230. However, any number of website analyzers may be utilized.

Figure 2B:
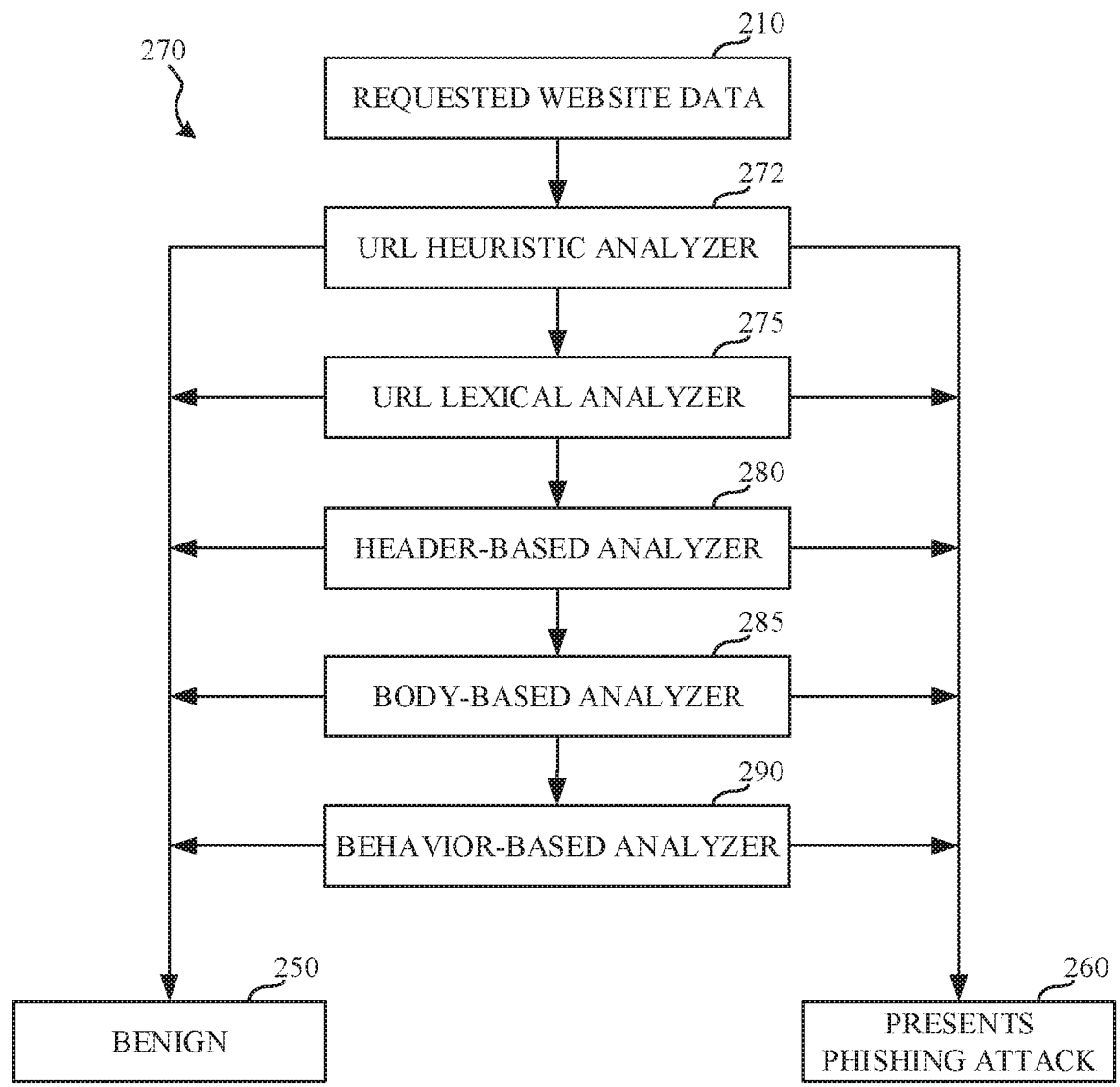
FIG. 2B is a block diagram describing a second example website analyzer chain to label requested website data as either a benign site or as presenting a phishing attack.

FIG. 2B is a block diagram describing a second example website analyzer chain 270 to label requested website data as either a benign site or as presenting a phishing attack. The example website analyzer chain 270 depicts an example organization of example website analyzers 140, which includes a uniform resource locator (URL) heuristic analyzer 272, a URL lexical analyzer 275, a header-based analyzer 280, a body-based analyzer 285, and a behavior-based analyzer 290. The example website analyzer chain 270 further includes a benign label 250 and a phishing attack label 260.

The example website analyzer chain accesses example requested website data 210. In some examples, the requested website data 210 includes a uniform resource locator (URL) to a requested website 110. In other examples, the requested website data 210 includes contents and/or metadata of a requested website 110.

The example URL heuristic analyzer 272 uses the requested website data 210 to execute an analysis on a requested website 110 to determine whether the requested website 110 is benign or suspicious. The example URL heuristic analyzer 272 may use requested website data such as, for example, the IP address of the requested website, a page rank of the requested website, or the length of the domain name of the requested website. However, any other URL heuristics may additionally and/or alternatively be used. If a confidence value of a classification by the example URL heuristic analyzer 270 exceeds the confidence threshold, and the classification indicates that the requested website 110 is legitimate, the website analyzer chain 270 classifies the requested website 110 as benign 250. If the confidence value exceeds the confidence threshold and the classification indicates that the requested website 110 is suspicious, the website analyzer chain 270 classifies the requested website 110 as presenting a phishing attack 260.

Otherwise, if the confidence value of the classification by the URL heuristic analyzer 272 does not exceed the confidence threshold, the example URL lexical analyzer 275 executes an analysis to determine whether the requested website 110 is benign or suspicious. If a confidence value of a classification by the example URL lexical analyzer 275 exceeds the confidence threshold, and the classification indicates that the requested website 110 is legitimate, the website analyzer chain 270 classifies the requested website 110 as benign 250. If the confidence value exceeds the confidence threshold and the classification indicates that the requested website 110 is suspicious, the website analyzer chain 270 classifies the requested website 110 as presenting a phishing attack 260.

Otherwise, if the confidence value of the classification by the URL lexical analyzer 275 does not exceed the confidence threshold, the example header-based analyzer 280 executes an analysis to determine whether the requested website 110 is benign or suspicious. The example header-based analyzer 280 is further explained as an example site content analyzer depicted in FIG. 4. If a confidence value of a classification by the example header-based analyzer 280 exceeds the confidence threshold, and the classification indicates that the requested website 110 is legitimate, the website analyzer chain 270 classifies the requested website 110 as benign 250. If the confidence value exceeds the confidence threshold and the classification indicates that the requested website 110 is suspicious, the website analyzer chain 270 classifies the requested website 110 as presenting a phishing attack 260.

Otherwise, if the confidence value of the classification by the header-based analyzer 280 does not exceed the confidence threshold, the example body-based analyzer 285 executes an analysis to determine whether the requested website 110 is benign or suspicious. The example body-based analyzer 285 is further explained as an example site content analyzer depicted in FIG. 4. If a confidence value of a classification by the example body-based analyzer 285 exceeds the confidence threshold, and the classification indicates that the requested website 110 is legitimate, the website analyzer chain 270 classifies the requested website 110 as benign 250. If the confidence value exceeds the confidence threshold and the classification indicates that the requested website 110 is suspicious, the website analyzer chain 270 classifies the requested website 110 as presenting a phishing attack 260.

Otherwise, if the confidence value of the classification by the body-based analyzer 285 does not exceed the confidence threshold, the example behavior-based analyzer 290 executes an analysis to determine whether the requested website 110 is benign or suspicious. The example behavior-based analyzer 290 is further explained as an example site behavior analyzer depicted in FIG. 5. If a confidence value of a classification by the example behavior-based analyzer 90 exceeds the confidence threshold, and the classification indicates that the requested website 110 is legitimate, the website analyzer chain 270 classifies the requested website 110 as benign 250. If the confidence value exceeds the confidence threshold and the classification indicates that the requested website 110 is suspicious, the website analyzer chain 270 classifies the requested website 110 as presenting phishing attack 260.

Figure 3:
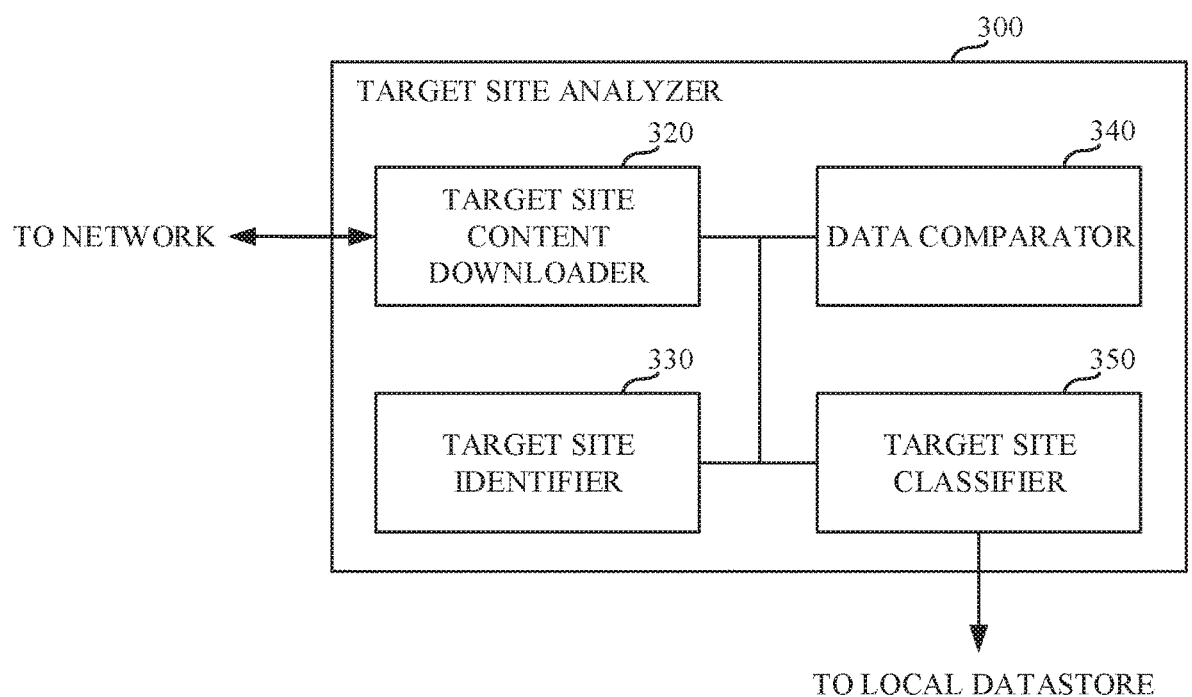
FIG. 3 is a block diagram of an example target site analyzer to classify a requested website as legitimate or suspicious using comparisons to target websites.

FIG. 3 is a block diagram of an example target site analyzer 300 to classify a requested website as legitimate or suspicious using comparisons to target websites. The example target site analyzer 300 of FIG. 3 includes an example target site content accessor 320, an example target site identifier 330, an example data comparator 340, and an example target site classifier 350.

The example target site content accessor 320 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example target site content accessor 320 accesses contents of a requested website 110. Further, the example target site content accessor 320 accesses contents of target websites identified by the example target site identifier 330. In some examples, the target site content accessor 320 retrieves the contents of the requested website 110 via a network such as the Internet. However, any other methods to retrieve the contents of the requested website 110 may additionally and/or alternatively be used. For example, portions of the contents may be stored in a cache in the local datastore 170.

The example target site identifier 330 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example target site identifier 330 identifies target websites that the requested website may be attempting to impersonate. In examples disclosed herein, the target site identifier 330 identifies target websites using named entity recognition on a requested website URL. Relevant words are identified from a Hypertext Markup Language (HTML) response from the requested website, and the words are matched with a set of known benign websites. However, any other methods to identify target websites may additionally and/or alternatively be used. For example, the target site identifier 330 may scan the contents of the requested website for words present in the contents of known benign websites.

The example data comparator 340 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example data comparator 340 executes a comparison between contents of the requested website and contents of target websites. In examples disclosed herein, the data comparator 340 executes an isomorphic comparison between elements on the requested website and elements of target websites. Elements on target websites are matched to elements of the requested website, and a ratio of matched elements to non-matched elements is calculated. However, any other methods to compare contents of the requested website to contents of target sites may additionally and/or alternatively be used. For example, the data comparator may execute an isomorphic comparison between images of the requested website and target websites, between copyright information, text block matching, etc.

The example target site classifier 350 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example target site classifier 350 classifies a requested website 110 as legitimate or suspicious using the output of the example data comparator 340. If the example data comparator 340 reports that a ratio of matched elements to non-matched elements between the requested site and target sites exceeds the confidence threshold, the example target site classifier 350 classifies the requested website as suspicious. If the example data comparator 340 reports that the ratio of matched elements to non-matched elements between the requested site and target sites does not exceed the confidence threshold, the example target site classifier 350 classifies the requested website as legitimate.

As previously mentioned, in examples disclosed herein, the data comparator 340 executes an isomorphic comparison between elements on the requested website and elements of target websites. However, any other approaches for comparing a requested website to a target site may additionally and/or alternatively be used.

In examples disclosed herein, the example target site classifier 350 indicates whether a requested website 110 is classified as presenting a phishing attack using a Boolean flag. However, any other method to indicate the presence of a phishing attack may additionally and/or alternatively be used.

Figure 4:
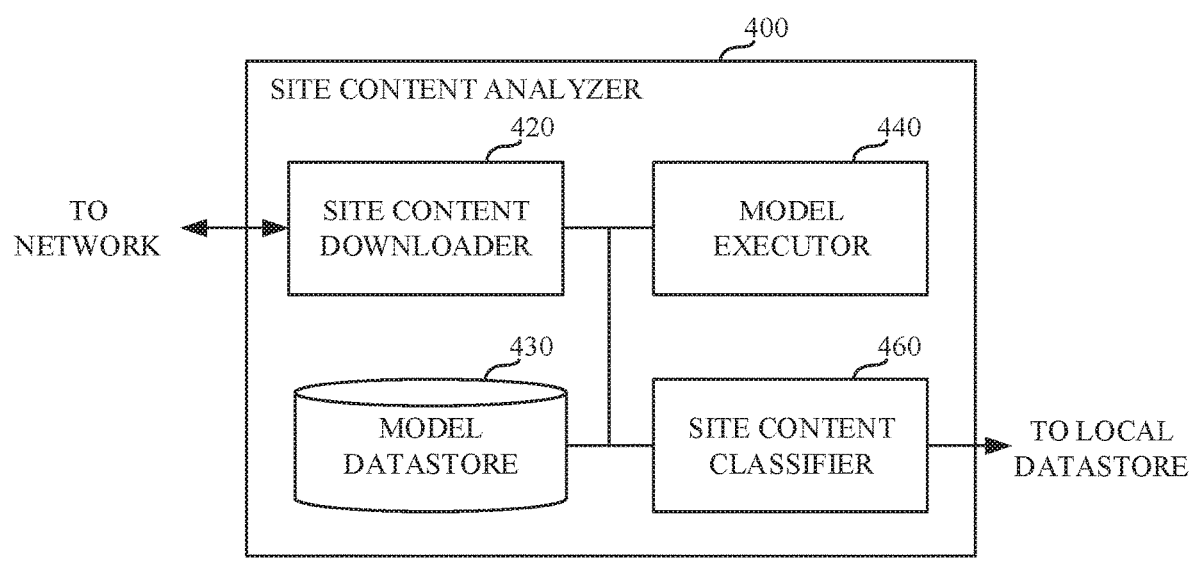
FIG. 4 is a block diagram of an example site content analyzer to classify a requested website as legitimate or suspicious using the contents of the requested website.

FIG. 4 is a block diagram of an example site content analyzer 400 to classify a requested website as legitimate or suspicious using the contents of the requested website. The example site content analyzer 400 of FIG. 4 includes an example site content accessor 420, an example model datastore 430, an example model executor 440, and an example site content classifier 460.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the MUM model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the MUM model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed at a central facility connected to a phishing detector 105 connected via network 115. Training is performed using hyperparameters that control how the learning is performed (e.g., a learning rate, a number of layers to be used in the machine learning model, etc.). In some examples re-training may be performed. Such re-training may be performed in response to a detected phishing attack.

Training is performed using training data. In examples disclosed herein, the training data originates from locally generated data at a central training facility. Because supervised training is used, the training data is labeled. Labeling is applied to the training data by the example site content classifier 460.

Once training is complete, the model is deployed for use as an executable construct that processes an input and provides an output based on the network of nodes and connections defined in the model. The model is stored at the example local datastore 170. The model may then be executed by the example model executor 440.

Once trained, the deployed model may be operated in an inference phase to process data, in the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold (or another criterion indicates that re-training should be performed), subsequent training of an updated model can be triggered using the feedback and an updated training data set, hyperparameters, etc., to generate an updated, deployed model.

The example site content accessor 420 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example site content accessor 4 accesses contents of a requested website. In some examples, the site content accessor 420 retrieves the contents of the requested website 110 via a network such as the Internet. However, any other methods to retrieve the contents of the requested website 110 may additionally and/or alternatively be used. For example, portions of the contents may be stored in a cache in the local datastore 170.

In some other examples, example requested website content accessors may be combined such that contents of a requested website 110 is retrieved once. For example, a first content accessor such as the target site content accessor 320 may download the contents of a requested website 110. A second content accessor, such as the site content accessor 420, may recognize that the contents has been retrieved and access the previously retrieved contents from the example local datastore 170.

The example model datastore 430 of the illustrated example of FIG. 1 is implemented by any memory, storage device and/or storage disc for storing data such as, for example, flash memory, magnetic media, optical media, solid state memory, hard drive(s), thumb drive(s), etc. Furthermore, the data stored in the example model datastore 430 may be in any data format such as, for example, binary data, comma delimited data, tab delimited data, structured query language (SQL) structures, etc. While, in the illustrated example, the example model datastore 430 is illustrated as a single device, the example model datastore 430 and/or any other data storage devices described herein may be implemented by any number and/or type(s) of memories. In the illustrated example of FIG. 4, the model datastore 430 stores the machine learning model to be executed by the model executor 440. In some examples, the model may be retrieved via a network such as the Internet.

The example model executor 440 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example model executor 440 processes one or more features as inputs to the trained model to generate an output indicative of whether the requested website 110 is suspicious or legitimate.

Many different types of machine learning models and/or machine learning architectures exist. In examples disclosed herein, a neural network model is used. However, other types of machine learning models could additionally or alternatively be used such as decision trees, support vector machines, etc. In examples disclosed herein, the model is trained using stochastic gradient descent. However, any other training algorithm may additionally or alternatively be used. In examples disclosed herein, training is performed until an acceptable amount of error is reached. In examples disclosed herein, training is performed at remotely (e.g., at a central facility).

The example site content classifier 460 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. If the output generated by the example model executor 440 indicates that the requested website 110 is suspicious, the example site content classifier 460 classifies the submitted site as suspicious. If the output generated by the example model executor 440 indicates that the requested website 110 is not suspicious, the example site content classifier 460 classifies the submitted site as legitimate. In examples disclosed herein, the example site content classifier 460 indicates whether a requested website 110 is classified as presenting a phishing attack using a Boolean flag. However, any other approach to classifying the requested website as presenting a phishing attack may additionally and/or alternatively be used.

Figure 5:
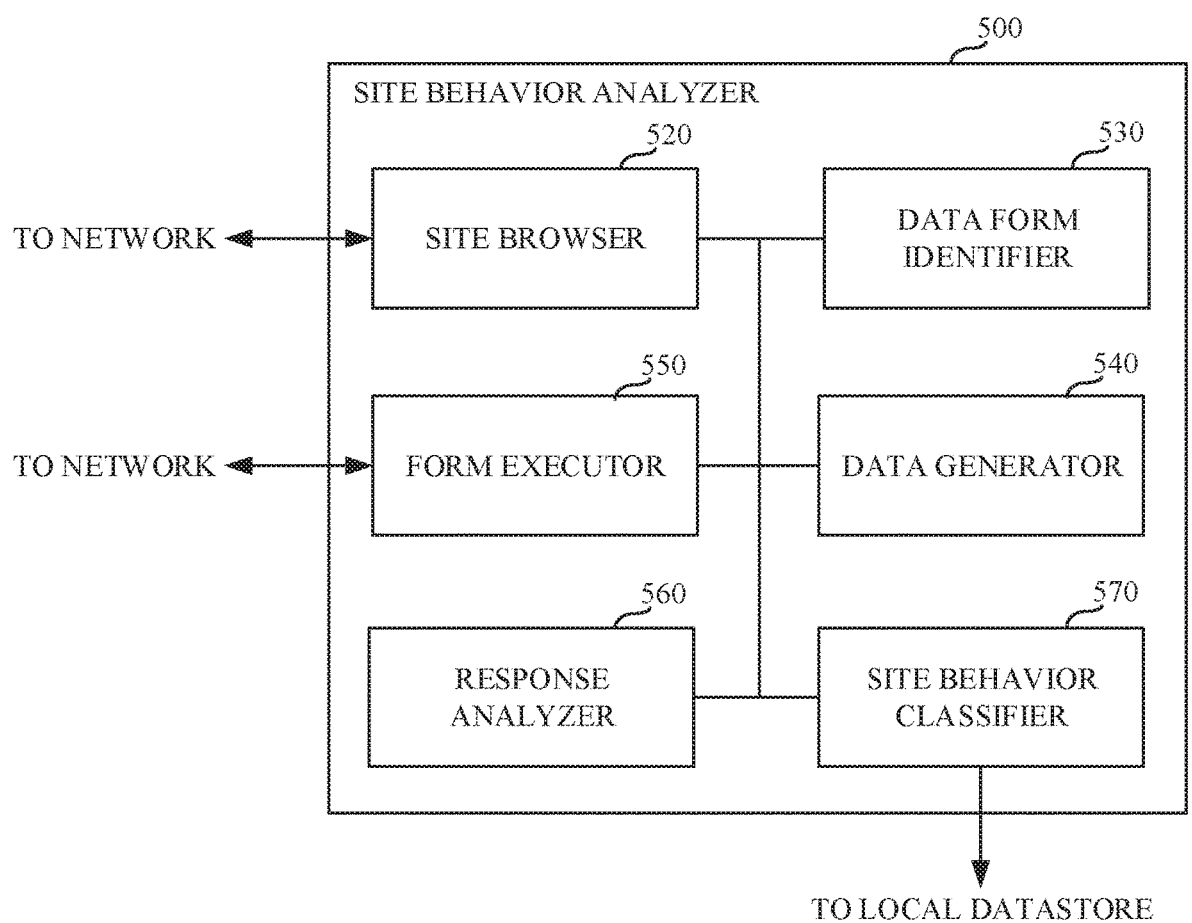
FIG. 5 is a block diagram of an example site behavior analyzer to classify a requested website as legitimate or suspicious using the behavior of the requested website in response to submitted data forms.

FIG. 5 is a block diagram of an example site behavior analyzer 500 that may be used to classify a requested website as legitimate or suspicious using the behavior of the requested website 110 in response to submitted data forms. The example site behavior analyzer 500 includes an example site browser 520, an example data form identifier 530, an example data generator 540, an example form executor 550, an example response analyzer 560, and an example site behavior classifier 570.

The example site browser 520 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example site browser 520 loads contents of a requested website 110 in a browser. (Block 920). In some examples, the site browser 520 may use a commercially available browser (e.g., MICROSOFT EDGE, GOOGLE CHROME). In other examples, the site browser 520 may download the contents of the requested website without the use of a commercially available browser. In some examples, the example site browser 520 implements means for browsing.

The example data form identifier 530 of the illustrated example of FIG. 5 is implemented by a logic circuit such as, for example, a hardware processor. However, any other type of circuitry may additionally or alternatively be used s as, for example, one or more analog or digital circuit(s), logic circuits, programmable processor(s), ASIC(s), PLD(s), FPLD(s), programmable controller(s), GPU(s), DSP(s), etc. The example data form identifier 530 identifies a form in the website contents that require input from a user. In some examples, the data form identifier 530 identifies forms that require sensitive data using an analysis of the names of form elements in the contents of the requested website. In other examples, the data form identifier 530 identifies a form that accepts data with multiple levels of sensitivity. In further examples, the data form identifier 530 identifies a form using the structure of element types in the contents of the requested website. In some examples, the example data form identifier 530 implements means for identifying.

The example data generator 540 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example data generator 540 generates data to be input into a form included in the contents of the requested website. In examples disclosed herein, the data generator 540 may generate a random string of characters to be input into the form. However, any other method of generating input data may additionally and/or alternatively be used. For example, the data generator 540 may access a predefined set of data inputs. In some examples, the data generator 540 may generate pseudo random data to be input into the form. In some examples, the example data generator 540 implements means for generating.

The example form executor 550 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example form executor 550 completes the forms within the contents of the requested website using the data generated by the example data generator 540 and submits the completed forms to the requested website 110. In examples disclosed herein, the form executor 550 may submit forms to the requested website 110 via a network such as the Internet. However, any other methods to submit forms may additionally and/or alternatively be used. Further, in some examples, the form executor 550 stores the response to submitted forms from the requested website 110 in the local datastore 170. In some examples, the example form executor 550 implements means for submitting.

The example response analyzer 560 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example response analyzer 560 analyzes a response to submitted forms from the requested website 110 for suspicious behavior. In some examples, the response analyzer 560 determines that the requested website 110 exhibits suspicious behavior if the response includes a request to transmit information to a domain different from a domain of the requested website. In other examples, the response analyzer 560 determines the requested website 110 exhibited suspicious behavior using the contents of the response from the requested website 110. In some examples, the example response analyzer 560 implements means for inspecting.

The example site behavior classifier 570 of the illustrated example of FIG. 5 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. If the example response analyzer 560 indicates that the response to submitted forms from the requested website 110 exhibit suspicious behavior, the example site behavior classifier 570 classifies the requested website 110 as suspicious. If the example response analyzer 560 indicates that the response to submitted forms from the requested website 110 does not exhibit suspicious behavior, the example site behavior classifier 570 classifies the requested website 110 as legitimate. In examples described within, the site behavior classifier 570 classifies the requested website 110 using in indication from the response analyzer 560. However, any other methods to classify the requested website 110 may additionally or alternatively be used. In some examples, the example site behavior classifier 570 implements means for determining.

Figure 6:
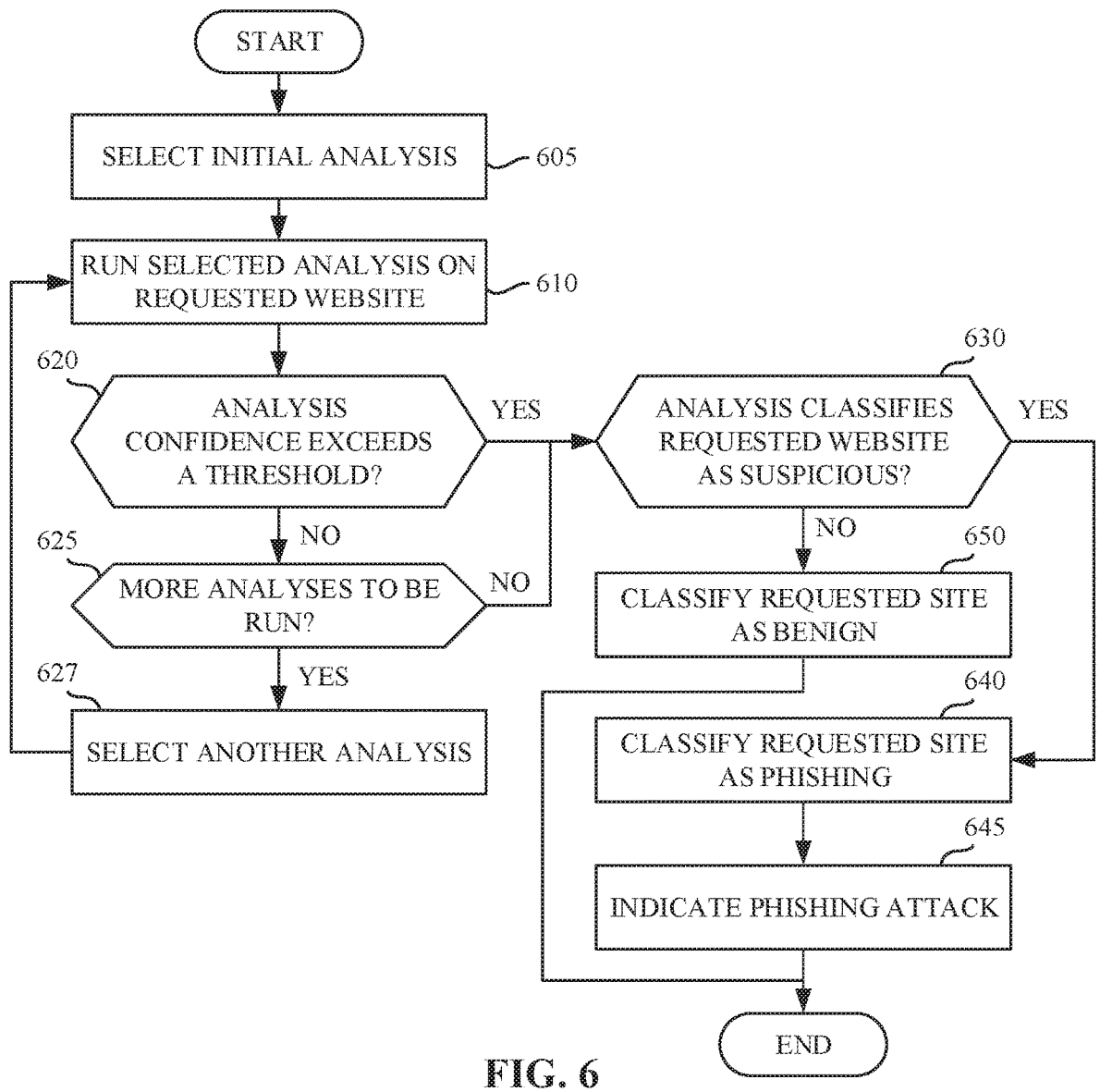
FIG. 6 is a flowchart representative of machine-readable instructions which may be executed to implement the example phishing detector of FIG. 1 to identify whether a requested website presents a phishing attack.

While an example manner of implementing the phishing detector of FIG. 1 is illustrated in FIG. 6, one or more of the elements, processes and/or devices illustrated in FIG. 6 may be combined, divided, re-arranged, omitted, eliminated and/or implemented in any other way. Further, the example analysis selector 120, the example website analyzers 140, the example website classifier 150, the example phishing indicator 160, the example local datastore 170, and/or, more generally, the example phishing detector of FIG. 1 may be implemented by hardware, software, firmware and/or any combination of hardware, software and/or firmware. Thus, for example, any of the example analysis selector 120, the example website analyzers 140, the example website classifier 150, the example phishing indicator 160, the example local datastore 170 and/or, more generally, the example phishing detector of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, analysis selector 120, the example website analyzers 140, the example website classifier 150, the example phishing indicator 160, the example local datastore 170 is/are hereby expressly defined to include a non-transitory computer readable storage device or storage disk such as a memory, a digital versatile disk (DVD), a compact disk (CD), a Blu-ray disk, etc. including the software and/or firmware. Further still, the example phishing detector of FIG. 1 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
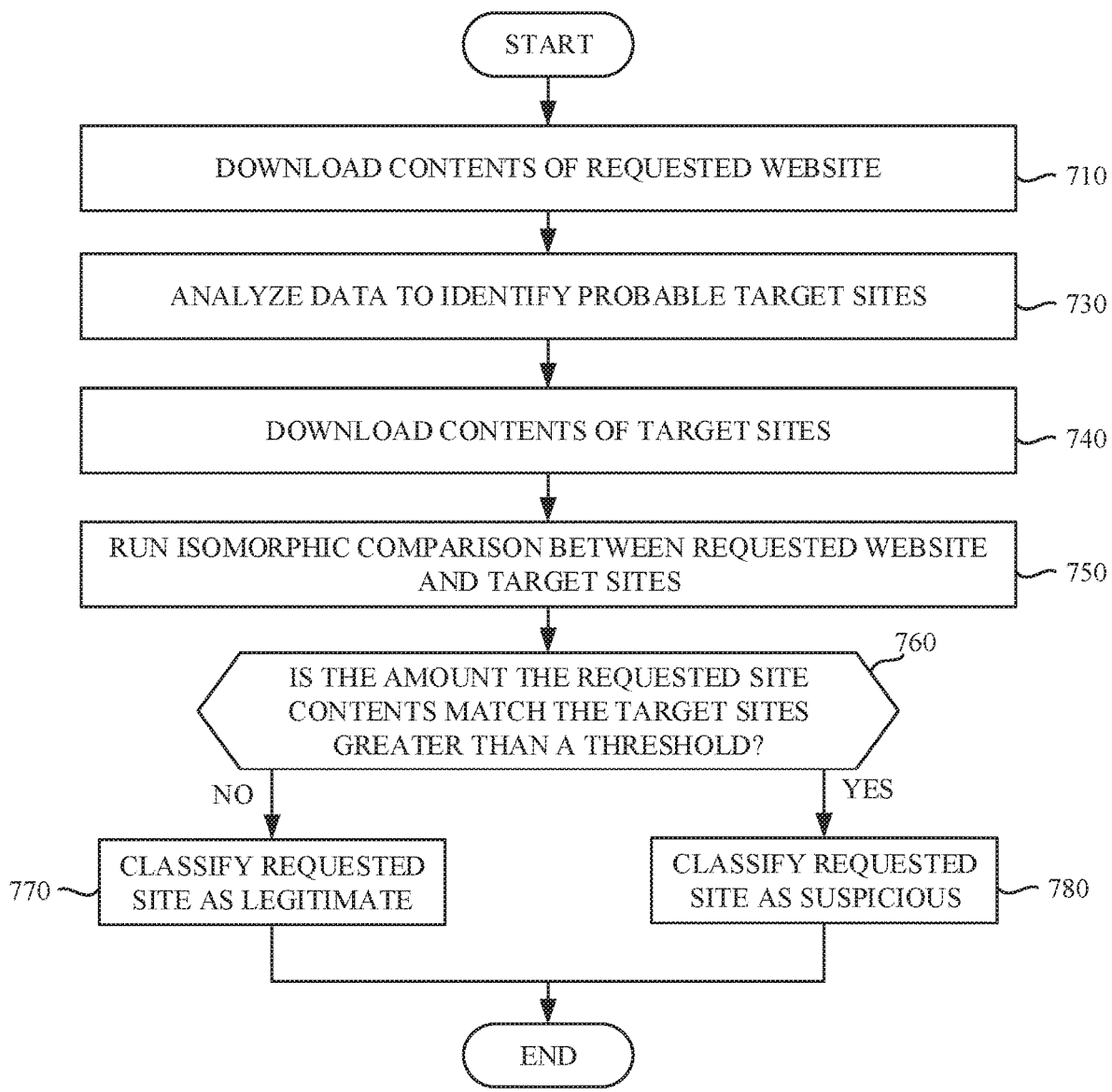
FIG. 7 is a flowchart representative of machine-readable instructions which may be executed to implement the example target site analyzer of FIG. 3 to perform an isomorphic comparison on a requested website and identified target websites.
Figure 8:
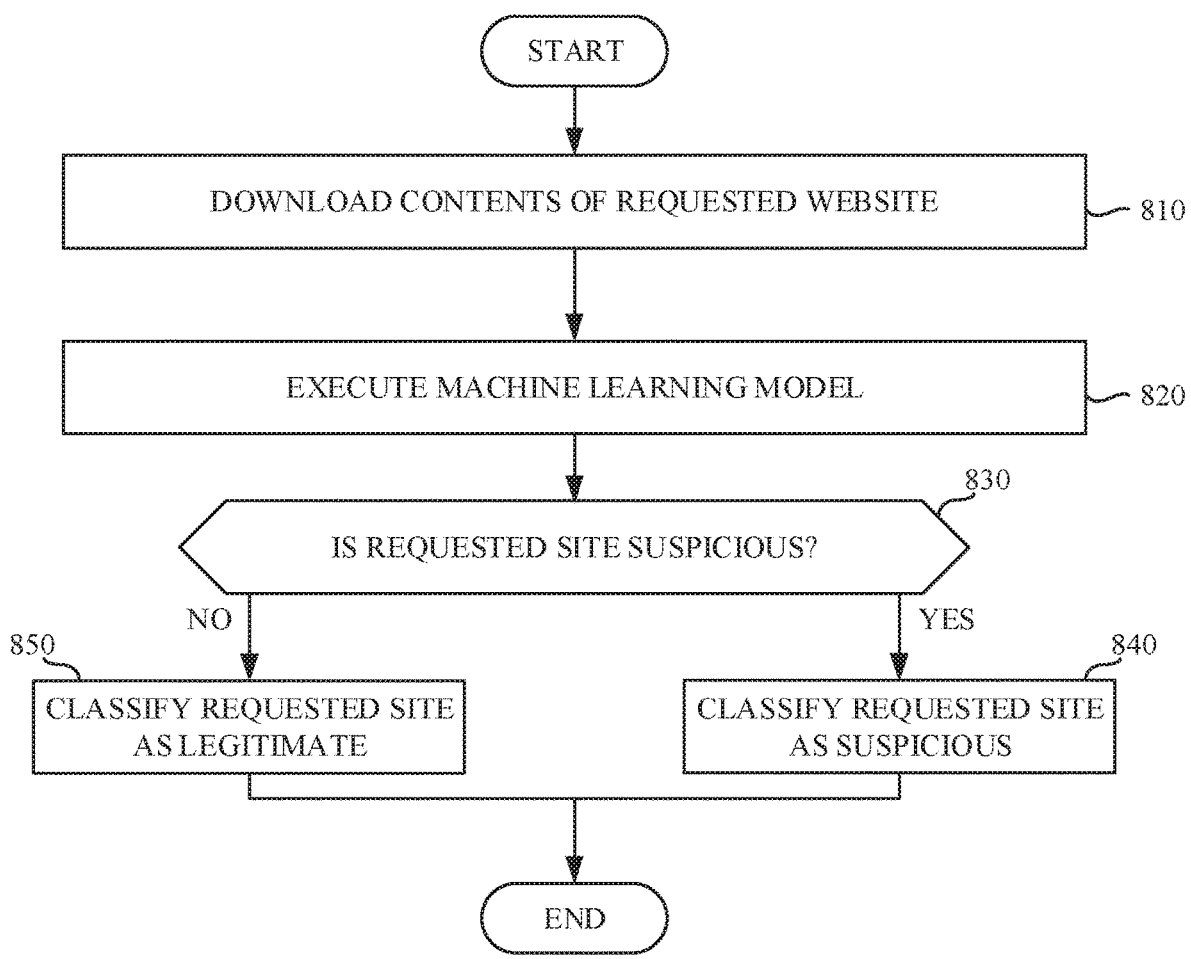
FIG. 8 is a flowchart representative of machine-readable instructions which may be executed to implement the example site content analyzer of FIG. 4 to examine the contents of a requested website to identify whether the requested website presents a phishing attack.

A flowchart representative of example hardware logic, machine readable instructions, hardware implemented state machines, and/or any combination thereof for implementing the example phishing detector 105, the example target site analyzer 300, the example site content analyzer 400, and/or the example site behavior analyzer 500 are shown in FIGS. 6, 7, 8, and/or 9. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIGS. 6, 7, 8, and/or 9, many other methods of implementing the example phishing detector 105 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6, 7, 8, and/or 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of machine-readable instructions which may be executed to implement the example phishing detector of FIG. 1 to identify whether a requested website presents a phishing attack. The example analysis selector 120 selects a first example website analyzer 140 to classify a requested website 110 as benign or suspicious. (Block 605). In examples disclosed herein, the example analysis selector 120 selects a first example website analyzer 140 using a predefined order. However, any other method for selecting a first example website analyzer 140 may be additionally and/or alternatively used. For example, the example analysis selector 120 may select a first example website analyzer 140 by selecting an analyzer that uses the lowest amount of resources. In some examples, the example analysis selector 120 implements means for selecting.

The example website analyzer 140 executes an analysis on a requested website 110. (Block 610). In some examples, a website analyzer 140 may retrieve the contents of the website via a network such as the Internet. In other examples, the website analyzer may classify a website using the contents of the website. In some examples, the example website analyzer 140 implements means for analyzing.

If the first example website analyzer 140 confidence value does not exceed the confidence threshold (e.g., block 620 returns a result of NO), and there are more website analyzers 140 to be executed (e.g., block 625 returns a result of YES), the example analysis selector 120 selects a second example website analyzer 140 to be executed. (Block 627). As mentioned above, the example analysis selector 120 selects an example website analyzer 140 using a predefined order. However, any other method for selecting an example website analyzer 140 may be additionally and/or alternatively used. The second example website analyzer 140 executes an analysis on a requested website 110. (Block 610).

Returning to block 620, if an example analyzer 140 confidence value exceeds the confidence threshold (e.g., block 620 returns a result of YES), and the example website analyzer 140 determines that a requested website 110 is suspicious (e.g., block 630 returns a result of YES), the example website classifier 150 classifies the requested website 110 as presenting a phishing attack. (Block 640). In some examples, the example website classifier 150 implements means for classifying.

The example phishing indicator 160 indicates to a user and/or client that the requested website was identified to be presenting a phishing attack. (Block 645). In examples disclosed herein, the example phishing indicator 160 indicates a phishing attack is present by redirecting a user to a webpage indicating that the requested website presented a phishing attack. However, any other methods to indicate the presence of a phishing attack may additionally and/or alternatively be used.

Returning to block 620, if an example analyzer 140 confidence value exceeds the confidence threshold (e.g., block 620 returns a result of YES), and the example website analyzer 140 determines that the requested website 110 is not suspicious (e.g., block 630 returns a result of YES), the example website classifier 150 classifies the requested website 110 as benign. (Block 650). As mentioned above, a website analyzer 140 may retrieve the contents of the website via a network such as the Internet. In other examples, the website analyzer may classify a website using the contents of the website.

Returning to block 620, if the second example website analyzer 140 confidence value does not exceed the confidence threshold (e.g., block 620 returns a result of NO), and there are no more website analyzers 140 to be executed (e.g., block 625 returns a result of NO), the example website classifier 150 classifies the requested website 110 using the classification of the last example website analyzer 140, as described above. (Block 630).

FIG. 7 is a flowchart representative of machine-readable instructions which may be executed to implement the example target site analyzer of FIG. 3 to perform an isomorphic comparison on a requested website and identified target websites. The example target site content accessor 320 accesses contents of a requested website 110. (Block 710). In some examples, the target site content accessor 320 retrieves the contents of the requested website 110 via a network such as the Internet. However, any other methods to retrieve the contents of the requested website 110 may additionally and/or alternatively be used. For example, portions of the contents may be stored in a cache in the local datastore 170.

The example target site identifier 330 identifies target websites that the requested website may be striving to impersonate. (Block 730). In examples disclosed herein, the target site identifier 330 identifies target websites using named entity recognition on a requested website URL. Relevant nouns are identified from the requested website URL and are matched with a set of known benign websites. However, any other methods to identify target websites may additionally and/or alternatively be used. For example, the target site identifier 330 may scan the contents of the requested website for words present in the contents of known benign websites.

The example target site content accessor 320 accesses contents of target websites identified by the example target site identifier 330 (Block 740). In some examples, the target site content accessor 320 retrieves the contents of target websites via a network such as the Internet. However, any other approach for accessing the contents of the requested website 110 may additionally and/or alternatively be used. For example, portions of the contents may be stored in a cache in the local datastore 170.

The example data comparator 340 executes a comparison between contents of the requested website and contents of target websites. (Block 750). In examples disclosed herein, the data comparator 340 executes an isomorphic comparison between elements on the requested website and elements of target websites. An isomorphic comparison maps structures present in one object to equivalent structures present n another object. Elements on target websites are matched to elements of the requested website, and a ratio of matched elements to non-matched elements is calculated. However, any other methods to compare contents of the requested website to contents of target sites may additionally and/or alternatively be used. For example, the data comparator may compare the Cascading Style Sheets (CSS) styling of elements on the requested website to the styling of elements on the target sites.

If the ratio of matched elements to non-matched elements between the requested site and target sites exceeds the confidence threshold (e.g., block 760 returns a value of YES), the example target site classifier 350 classifies the requested website as suspicious. (Block 780). If the ratio of matched elements to non-matched elements between the requested site and target sites does not exceed the confidence threshold (e.g., block 760 returns a value of NO), the example target site classifier 350 classifies the requested website as legitimate. (Block 770).

FIG. 8 is a flowchart representative of machine-readable instructions which may be executed to implement the example site content analyzer of FIG. 4 to examine the contents of a requested website to identify whether the requested website presents a phishing attack. The example site content accessor 420 accesses contents of a requested website. (Block 810). In some examples, the site content accessor 420 retrieves the contents of the requested website 110 via a network such as the Internet. However, any other methods to retrieve the contents of the requested website 110 may additionally and/or alternatively be used. For example, portions of the contents may be stored in a cache in the local datastore 170.

The example model executor 440 executes the trained model stored in the example model datastore 430. (Block 820). In some examples, the model may be retrieved via a network such as the Internet. In other examples, the model executor 440, may execute a trained machine learning model stored at the local datastore 170. The example model executor 440 processes features in the trained model to generate an output indicative of whether the requested website 110 is suspicious (e.g., malicious) or legitimate (e.g., benign).

If the output generated by the example model executor 440 indicates that the requested website 110 is suspicious (e.g., block 830 returns a result of YES), the example site content classifier 460 classifies the submitted site as suspicious. (Block 840). If the output generated by the example model executor 440 indicates that the requested website 110 is not suspicious (e.g., block 830 returns a result of NO), the example site content classifier 460 classifies the submitted site as legitimate. (Block 850). In examples disclosed herein, the example site content classifier 460 indicates whether a requested website 110 is classified as presenting a phishing attack using a Boolean flag. However, any other method to indicate the presence of a phishing attack may additionally and/or alternatively be used.

Figure 9:
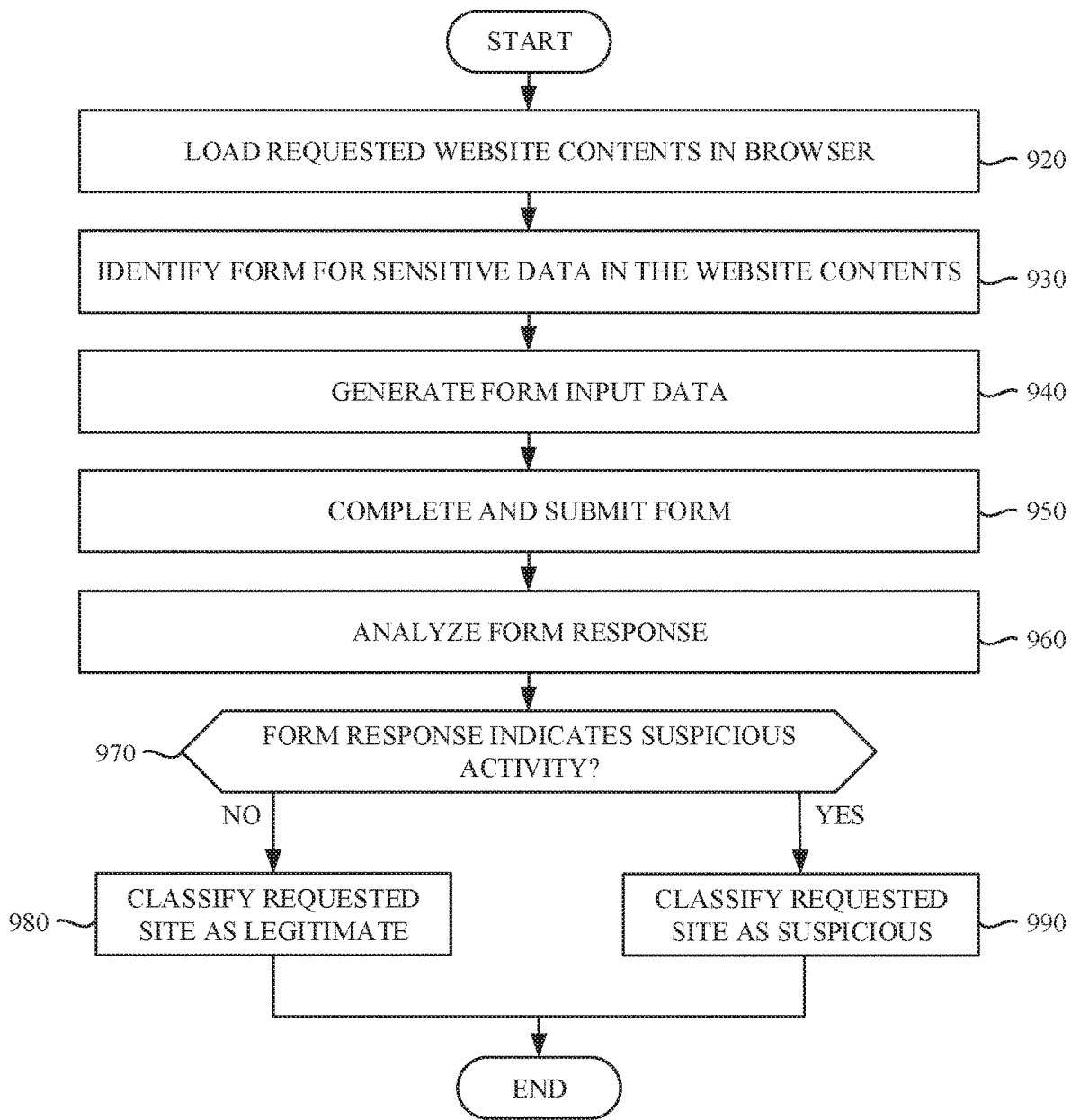
FIG. 9 is a flowchart representative of machine-readable instructions which may be executed to implement the example site behavior analyzer of FIG. 5 to examine the behavior of a requested website to identify whether the requested website presents a phishing attack.

FIG. 9 is a flowchart representative of machine-readable instructions which may be executed to implement the example site behavior analyzer of FIG. 5 to examine the behavior of a requested website to identify whether the requested website presents a phishing attack. The example site browser 520 loads contents of a requested website 110 in a browser. (Block 920). In some examples, the site browser 520 may use a commercial browser (e.g., MICROSOFT EDGE, GOGGLE CHROME). In other examples, the site browser 520 may download the contents of the requested website without the use of a commercial browser. In some examples, the example site browser 520 implements means for browsing.

The example data form identifier 530 identifies a form in the website contents that accepts input from a user. (Block 930). In some examples, the data form identifier 530 identifies a form that accepts sensitive data using an analysis of the names of form elements in the contents of the requested website. In other examples, the data form identifier 530 identifies a form that accepts data with multiple levels of sensitivity. In further examples, the data form identifier 530 identifies a form using the structure of element types in the contents of the requested website. In some examples, the example data form identifier 530 implements means for identifying.

The example data generator 540 generates data to be input into a form in the contents of the requested website. (Block 940). In examples disclosed herein, the data generator 540 may generate pseudo-random data to be input into the forms. However, any other method of generating input data may additionally and/or alternatively be used. For example, the data generator 540 may access a predefined set of data inputs. In some examples, the example data generator 540 implements means for generating.

The example form executor 550 completes the form within the contents of the requested website using the data generated by the example data generator 540 and submits the completed form to the requested website 110. (Block 950). In examples disclosed herein, the form executor 550 may submit the form to the requested website 110 via a network such as the Internet. However, any other methods to submit forms may additionally and/or alternatively be used. Further, in some examples, the form executor 550 stores the response to a submitted form from the requested website 110 in the local datastore 170. In some examples, the example form executor 550 implements means for submitting.

The example response analyzer 560 analyzes a response to a submitted form from the requested website 110 for suspicious behavior. (Block 960). In some examples, the response analyzer 560 determines the requested website 110 exhibited suspicious behavior if the response includes a request to transmit information to a domain different from a domain of the requested website. In other examples, the response analyzer 560 determines the requested website 110 exhibited suspicious behavior using the contents of the response from the requested website 110. In some examples, the example response analyzer 560 implements means for inspecting.

If the example response analyzer 560 indicates that the response to submitted forms from the requested website 110 exhibit suspicious behavior (e.g., block 970 returns a result of YES), the example site behavior classifier 570 classifies the requested website 110 as suspicious. (Block 980). If the example response analyzer 560 indicates that the response to submitted forms from the requested website 110 does not exhibit suspicious behavior (e.g., block 970 returns a result of NO), the example site behavior classifier 570 classifies the requested website 110 as legitimate, (Block 990). In some examples, the example site behavior classifier 570 implements means for determining.

Figure 10:
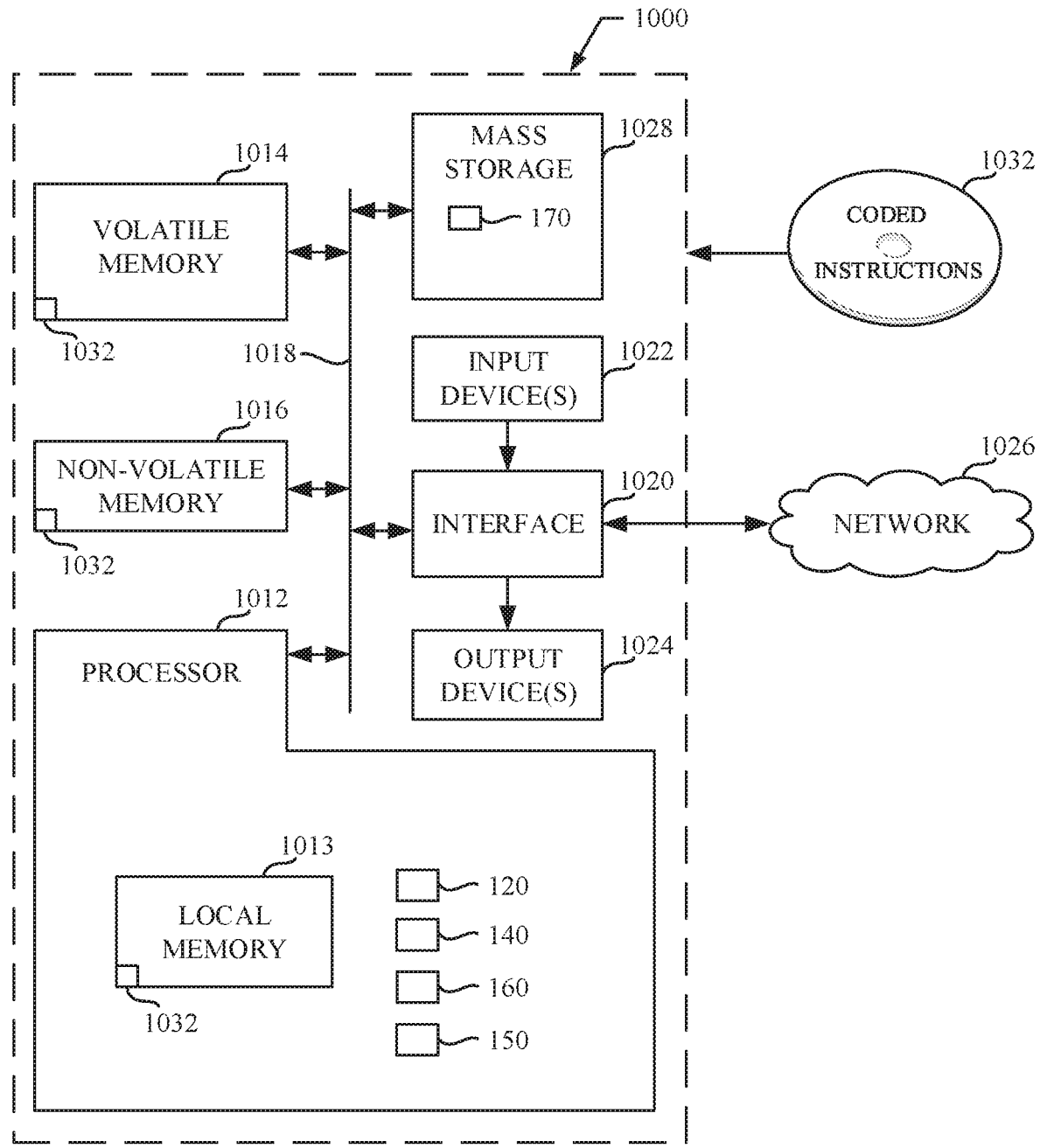
FIG. 10 is a block diagram of an example processing platform structured to execute the instructions of FIGS. 6, 7, 8, and/or 9 to implement the example phishing detector of FIG. 1.

FIG. 10 is a block diagram of an example processor platform 1000 structured to execute the instructions of FIGS. 6, 7, 8, and/or 9 to implement the example phishing detector of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example analysis selector 20, the example website analyzers 140, the example website classifier 150, and the example phishing indicator 160.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NEC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 6, 7, 8, and/or 9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that detect website phishing attacks using a combination of website analytic methods. The disclosed methods, apparatus and articles of manufacture improve the efficiency of using a computing device both by short-circuiting a chain of website analyzers if a confidence value is high, and by analyzing the behavior of a requested website in response to a submission of a data form. Short-circuiting reduces processor requirements to detect the presence of a phishing attack by returning a classification once the confidence threshold has been reached. Short-circuiting allows lower-power devices to be used for website analysis, and can enable the tuning of performance based on response time and/or accuracy. The disclosed methods, apparatus and articles of manufacture are accordingly directed to one or more improvements) in the functioning of a computer.

Example methods, apparatus, systems, and articles of manufacture to detect website phishing attacks are disclosed herein. Further examples and combinations thereof include the following:

Example 1 includes an apparatus to detect website-based phishing attacks, the apparatus comprising a plurality of website analyzers to analyze a requested website for evidence of a phishing attack, the plurality of website analyzers including a first website analyzer and a second website analyzer, an analysis selector to select the first website analyzer for execution, the analysis selector to, in response to determining that an additional analyzer is to be executed, select the second website analyzer to analyze the requested website, and a website classifier to, in response to a website analyzer indicating a classification that exceeds a confidence threshold, classify the requested website as a benign site or presenting a phishing attack.

Example 2 includes the apparatus of example 1, wherein the analysis selector is to determine whether the second website analyzer is to be executed based on a confidence value returned by first website analyzer.

Example 3 includes the apparatus of example 1, further including a third website analyzer to identify a target site the requested website may be impersonating and to compare data from the requested website to data from the target site.

Example 4 includes the apparatus of example 1, further including a third website analyzer to analyze a behavior of the requested website in response to a submission of a data form of the requested website.

Example 5 includes the apparatus of example 4, wherein the third website analyzer includes a site browser request the requested website, a data form identifier to identify a form in the requested website that accepts input, a data generator to generate data to be placed into the form, a form executor to submit the form, a response analyzer to analyze a response of the requested website to the form, and a site behavior classifier to determine whether the requested website is a phishing attack using a behavior of the requested website.

Example 6 includes the apparatus of example 5, wherein the data generator is to generate data to be placed into the requested website using a random data generator.

Example 7 includes the apparatus of example 5, wherein the site behavior classifier is to determine whether the requested website is the phishing attack by determining whether the response from the requested website includes a redirection request to a different domain than that of the requested website.

Example 8 includes the apparatus of example 5, wherein the site behavior classifier is to determine whether the requested website is the phishing attack by determining whether the response from the requested website includes a request for a user to input additional information.

Example 9 includes at least one non-transitory computer readable medium comprising instructions that, when executed, cause at least one processor to at least select a first website analyzer to analyze a requested website, analyze the requested website for evidence of a phishing attack, determine whether a second analyzer is to be executed, in response to determining that an additional analyzer is to be executed, select a second website analyzer to analyze the requested website, and in response to an indication that a classification exceeds a confidence threshold, classify the requested website as a benign site or as presenting a phishing attack.

Example 10 includes the at least one non-transitory computer readable medium of example 9, wherein the instructions, when executed, cause the at least one processor to determine whether the second website analyzer is to be executed based on a confidence value returned by the first website analyzer.

Example 11 includes the at least one non-transitory computer readable medium of example 9, wherein the instructions, when executed, cause the at least one processor to analyze the requested website for evidence of a phishing attack by identifying target sites the requested website may be impersonating and comparing data from the requested website to data from the target sites.

Example 12 includes the at least one non-transitory computer readable medium of example 9, wherein the instructions, when executed, cause the at least one processor analyze the requested website for evidence of a phishing attack by analyzing a behavior of the requested website in response to a submission of a data form of the requested website.

Example 13 includes the at least one non-transitory computer readable medium of example 12, wherein the instructions, when executed, further cause at least one processor to at least request a requested website, identify a data form in the requested website that accepts input, generate data to be placed into the form, submit the form, analyze a response of the requested website to the form, and determine whether the requested website is a phishing attack using a behavior of the requested website.

Example 14 includes the at least one non-transitory computer readable medium of example 13, wherein the instructions, when executed, cause the at least one processor to generate data to be placed into the requested website by using a random data generator.

Example 15 includes the at least one non-transitory computer readable medium of example 13, wherein the instructions, when executed, cause the at least one processor to determine whether the requested website is the phishing attack by determining whether the response from the requested website includes a redirection request to a different domain than that of the requested website.

Example 16 includes the at least one non-transitory computer readable medium of example 13, wherein the instructions, when executed, cause the at least one processor to determine whether the requested website is the phishing attack by determining whether the response from the requested website includes a request for a user to input additional information.

Example 17 includes a method of detecting whether a requested website is presenting a phishing attack, the method comprising selecting a first website analyzer to analyze the requested website, analyzing the requested website for evidence of a phishing attack, determining, by executing an instruction with a processor, whether an additional analyzer is to be executed, in response to determining that the additional analyzer is to be executed, selecting a second website analyzer to analyze the requested website, and in response to an indication that a classification exceeds a confidence threshold, classifying, by executing an instruction with the processor, the requested website as a benign site or as presenting a phishing attack.

Example 18 includes the method of example 17, wherein the determining whether the second website analyzer is to be executed based on a confidence value returned by the first website analyzer.

Example 19 includes the method of example 17, wherein the analyzing the requested website for evidence of a phishing attack includes identifying target sites the requested website may be impersonating and comparing data from the requested website to data from the target sites.

Example 20 includes the method of example 17, wherein the analyzing the requested website for evidence of a phishing attack includes analyzing a behavior of the requested website in response to a submission of data forms in the requested website.

Example 21 includes the method of example 20, wherein the analyzing of the behavior of the requested website includes requesting the requested website, identifying, by executing an instruction with a processor, a data form in the requested website that accepts input, generating, by executing an instruction with the processor, data to be placed into the form, submitting, by executing an instruction with the processor, the form, analyzing, by executing an instruction with the processor, a response of the requested website to the form, and determining whether the requested website is a phishing attack using the behavior of the requested website.

Example 22 includes the method of example 21, wherein the generating of data to be placed into the requested website includes using a random data generator.

Example 23 includes the method of example 21, wherein the determining whether the requested website is the phishing attack includes determining whether the response from the requested website includes a redirection request to a different domain than that of the requested website.

Example 24 includes the method of example 21, wherein the determining whether the requested website is the phishing attack includes determining whether the response from the requested website includes a request for a user to input additional information.

Example 25 includes an apparatus to detect website-based phishing attacks, the apparatus comprising first means for analyzing, second means for analyzing, the first and second means for analyzing to analyze a requested website for evidence of a phishing attack, means for selecting to select a first website analyzer for execution, the means for selecting to, in response to determining that an additional analyzer is to be executed, select a second website analyzer to analyze the requested website, and means for classifying to, in response to a website analyzer indicating a classification that exceeds a confidence threshold, classify the requested website as a benign site or presenting a phishing attack.

Example 26 includes the apparatus of example 25, wherein the means for selecting is to determine whether the second website analyzer is to be executed based on a confidence value returned by the first website analyzer.

Example 27 includes the apparatus of example 25, further including third means for analyzing to identify a target site the requested website may be impersonating and to compare data from the requested website to data from the target site.

Example 28 includes the apparatus of example 25, further including third means for analyzing to analyze a behavior of the requested website in response to a submission of a data form of the requested website.

Example 29 includes the apparatus of example 28, wherein the third means for analyzing includes means for browsing to request the requested website, means for identifying a form in the requested website that accepts input, means for generating a data generator to generate data to be placed into the form, means for submitting the form, means for inspecting to analyze a response of the requested website to the form, and means for determining whether the requested website is a phishing attack using a behavior of the requested website.

Example 30 includes the apparatus of example 28, wherein the means for generating is to generate data to be placed into the requested website using a random data generator.

Example 31 includes the apparatus of example 28, wherein the means for determining is to determine whether the requested website is the phishing attack by determining whether the response from the requested website includes a redirection request to a different domain than that of the requested website.

Example 32 includes the apparatus of example 28, wherein the means for determining is to determine whether the requested website is the phishing attack by determining whether the response from the requested website includes a request for a user to input additional information.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to detect website-based phishing attacks, the apparatus comprising:
    website analyzer circuitry to analyze a requested website for evidence of a phishing attack, the website analyzer circuitry including first website analyzer circuitry and second website analyzer circuitry;
    analysis selector circuitry to: select the first website analyzer circuitry in response to determining that the first website analyzer circuitry will utilize fewer expected resources compared to the second website analyzer circuitry, the first website analyzer circuitry to analyze the requested website, the first website analyzer circuitry to determine a first classification and a first confidence value associated with the first classification; and
    after analysis of the requested website by the first website analyzer circuitry and in response to an execution duration of the analysis by the first website analyzer circuitry not satisfying an execution duration threshold, select the second website analyzer circuitry to analyze the requested website, the second website analyzer circuitry to determine a second classification and a second confidence value associated with the second classification; and
    website classifier circuitry to, after the analysis of the requested website by at least the first website analyzer circuitry:
        in response to the execution duration of the analysis by the first website analyzer circuitry satisfying the execution duration threshold, classify the requested website as a benign site or presenting a phishing attack based on the first classification; and
        in response to the execution duration of the analysis by the first website analyzer circuitry not satisfying the execution duration threshold, classify the requested website based on the second classification, as a benign site or a malicious site presenting a phishing attack.

2. The apparatus of claim 1, further including third website analyzer circuitry to identify a target site the requested website may be impersonating and to compare data from the requested website to data from the target site.

3. The apparatus of claim 1, further including third website analyzer circuitry to analyze a behavior of the requested website in response to a submission of a data form of the requested website.

4. The apparatus of claim 3, wherein the third website analyzer circuitry includes:
    site browser circuitry to request the requested website;
    data form identifier circuitry to identify the data form in the requested website that accepts input;
    data generator circuitry to generate data to be placed into the data form;
    form executor circuitry to submit the data form;
    response analyzer circuitry to analyze a response of the requested website to the data form; and
    site behavior classifier circuitry to determine whether the requested website presents a phishing attack based on the response of the requested website.

5. The apparatus of claim 4, wherein the data generator circuitry is to generate the data to be placed into the requested website using random data generator circuitry.

6. The apparatus of claim 4, wherein the site behavior classifier circuitry is to determine whether the requested website presents the phishing attack by determining whether the response from the requested website includes a redirection request to a different domain than that of the requested website.

7. The apparatus of claim 4, wherein the site behavior classifier circuitry is to determine whether the requested website presents the phishing attack by determining whether the response from the requested website includes a request for a user to input additional information.

8. At least one non-transitory computer readable medium comprising instructions that, when executed, cause at least one processor to at least:
    select first website analyzer circuitry to analyze a requested website in response to determining that the first website analyzer circuitry utilizes fewer expected resources compared to second website analyzer circuitry;
    analyze, using the first website analyzer circuitry, the requested website for evidence of a phishing attack, the first website analyzer circuitry to determine a first classification and a first confidence value associated with the first classification;
    after analysis of the requested website by the first website analyzer circuitry and in response to an execution duration of the analysis by the first website analyzer circuitry not satisfying an execution duration threshold, select the second website analyzer circuitry to analyze the requested website, the second website analyzer circuitry to determine a second classification and a second confidence value associated with the second classification; and
    after the analysis of the requested website by at least the first website analyzer circuitry:
        in response to the execution duration of the analysis by the first website analyzer circuitry satisfying the execution duration threshold, classify the requested website as a benign site or as presenting a phishing attack based on the first classification; and
        in response to the execution duration of the analysis by the first website analyzer circuitry not satisfying the execution duration threshold, classify the requested website based on the second classification, as a benign site or a malicious site presenting a phishing attack.

9. The at least one non-transitory computer readable medium of claim 8, wherein the instructions, when executed, cause the at least one processor to analyze the requested website by identifying target sites the requested website may be impersonating and comparing data from the requested website to data from the target sites.

10. The at least one non-transitory computer readable medium of claim 8, wherein the instructions, when executed, cause the at least one processor to analyze the requested website by analyzing a behavior of the requested website in response to a submission of a data form of the requested website.

11. The at least one non-transitory computer readable medium of claim 10, wherein the instructions, when executed, further cause the at least one processor to at least:
    identify a data form in the requested website that accepts input;
    generate data to be placed into the data form;
    submit the data form;
    analyze a response of the requested website to the data form; and
    determine whether the requested website presents a phishing attack based on the response of the requested website.

12. The at least one non-transitory computer readable medium of claim 11, wherein the instructions, when executed, cause the at least one processor to generate the data to be placed into the requested website by using a random data generator.

13. The at least one non-transitory computer readable medium of claim 11, wherein the instructions, when executed, cause the at least one processor to determine whether the requested web site presents the phishing attack by determining whether the response from the requested website includes a redirection request to a different domain than that of the requested website.

14. The at least one non-transitory computer readable medium of claim 11, wherein the instructions, when executed, cause the at least one processor to determine whether the requested web site presents the phishing attack by determining whether the response from the requested website includes a request for a user to input additional information.

15. A method of detecting whether a requested website is presenting a phishing attack, the method comprising:
    selecting first website analyzer circuitry to analyze the requested website in response to determining that the first website analyzer circuitry utilizes fewer expected resources compared to second website analyzer circuitry;
    analyzing, using the first website analyzer circuitry, the requested website for evidence of a phishing attack, the first website analyzer circuitry to determine a first classification and a first confidence value associated with the first classification;
    after analysis of the requested website by the first website analyzer circuitry and in response to an execution duration of the analysis by the first website analyzer circuitry not satisfying an execution duration threshold, selecting the second website analyzer circuitry to analyze the requested website, the second website analyzer circuitry to determine a second classification and a second confidence value associated with the second classification; and
    after the analysis of the requested website by the first website analyzer circuitry:
        in response to the execution duration of the analysis by the first website analyzer circuitry satisfying the execution duration threshold, classifying, by executing an instruction with processor circuitry, the requested website as a benign site or as presenting a phishing attack based on the first classification; and
        in response to the execution duration of the analysis by the first website analyzer circuitry not satisfying the execution duration threshold, classify the requested website based on the second classification, as a benign site or a malicious site presenting a phishing attack.

16. The method of claim 15, wherein the analyzing of the requested website for evidence of a phishing attack includes identifying target sites the requested website may be impersonating and comparing data from the requested web site to data from the target sites.

17. The method of claim 15, wherein the analyzing of the requested website for evidence of a phishing attack includes analyzing a behavior of the requested website in response to a submission of data forms in the requested website.

18. The apparatus of claim 1, wherein the first website analyzer circuitry is to analyze the requested website based on one or more Uniform Resource Locator (URL) heuristics associated with the requested website.

19. The apparatus of claim 18, wherein the one or more URL heuristics are based on at least one of an IP address of the requested website, a page rank of the requested website, or a length of a domain name of the requested website.

20. The apparatus of claim 1, the second website analyzer circuitry to analyze the requested website based on URL lexical analysis.

21. The apparatus of claim 1, wherein the analysis selector circuitry to:
- determine a first time at which the first website analyzer circuitry was last run;
- determine a second time at which the second website analyzer circuitry was last run; and
- select the first website analyzer circuitry to analyze the requested website in response to determining that the first time is earlier than the second time.

\* \* \* \* \*